United States Patent Office 3,458,784
Patented July 29, 1969

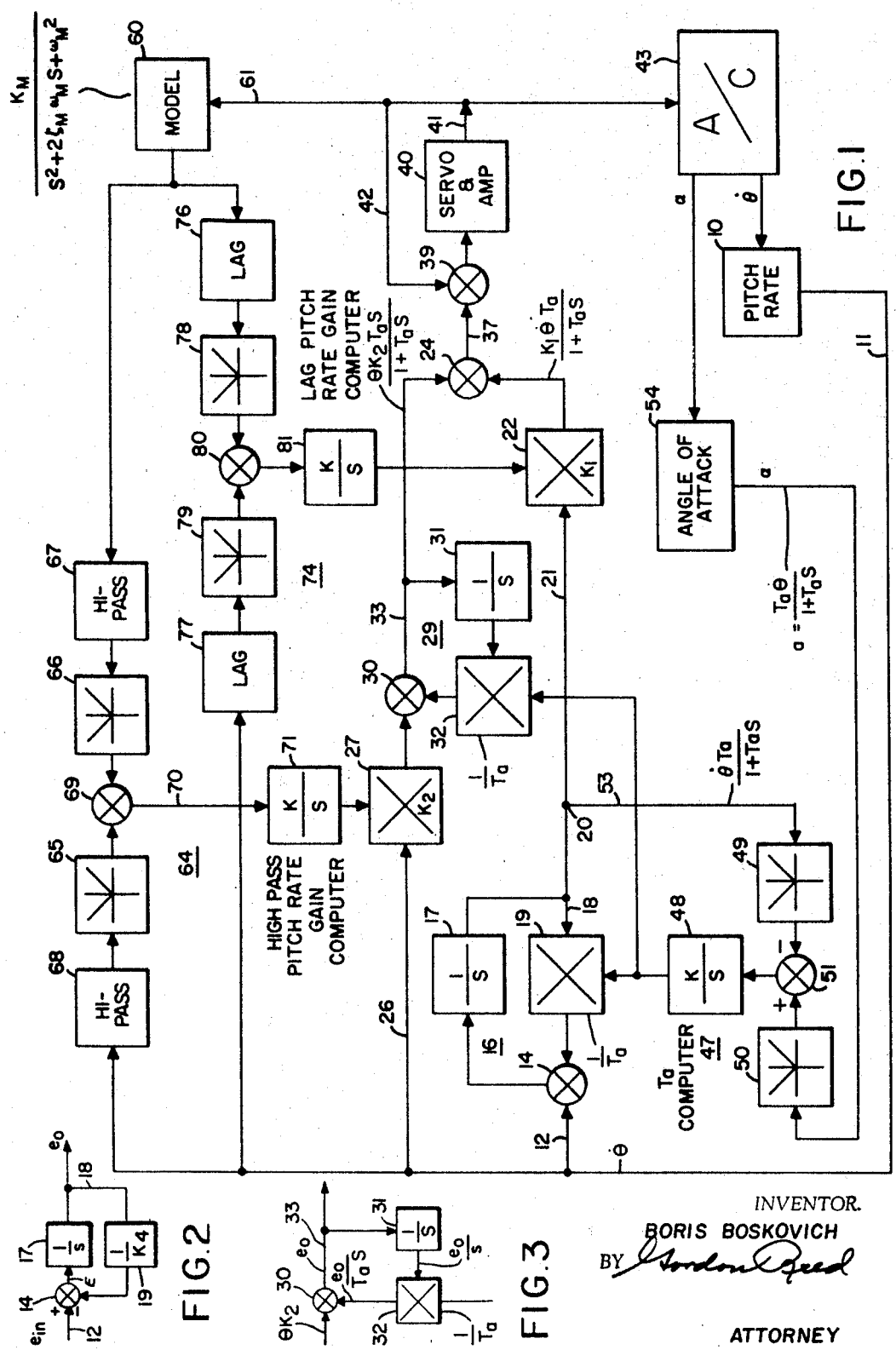

3,458,784
ADAPTIVE SERVO CONTROL FOR AN AUTOPILOT
Boris Boskovich, Minneapolis, Minn., assignor to Honeywell Inc., Minneapolis, Minn., a corporation of Delaware
Filed Dec. 10, 1965, Ser. No. 512,886
Int. Cl. B64d 43/00
U.S. Cl. 318—18        10 Claims

ABSTRACT OF THE DISCLOSURE

An automatic pilot for an aircraft having damping and frequency qualities is provided with a control system or autopilot for the aircraft control surfaces. The control system combines its operation with the response of the craft, to which may be applied flight attitude disturbances. The control equation for the autopilot may include for example terms that provide that the autopilot augment the aircraft damping action and natural frequency during changes in flight conditions such as airspeed affecting the aircraft so that the combined aircraft-autopilot response accords with the response of a model.

---

The present invention relates to an improvement in automatic control apparatus for maintaining a condition at a predetermined value. The invention has been applied to condition control apparatus of the type which not only includes displacement type sensors maintaining a condition at a predetermined value but also includes condition change rate sensing means which is used for damping variations of the condition from a desired value. Thus the invention has been applied to a type of condition control apparatus as disclosed for example in the U.S. Patent No. 2,953,733 to R. N. Bretoi dated September 1960.

In FIGURE I of said Bretoi patent there is shown an automatic condition control system such as an automatic pilot or autopilot for aircraft wherein a sensor 30 is provided in the control system to maintain a condition. The system includes condition change rate sensing means such as a pitch rate gyro 65 which through two gain devices 80, 74 supplies input signals to an integrator 55, in the feedback path of the integrator. The invention in this application is concerned with automatically adjusting the gain in devices 74, 80 and 82 in a control system or autopilot of the type disclosed in the patent for various operation conditions of the system to adapt it to various conditions.

An object therefore of this invention is to provide an improved adaptive flight control system of the linear type.

A further object of this invention is to provide an improved aircraft condition control system having damping means therein with means for adjusting the damping means for varying flight conditions of an aircraft.

A further object of this invention is to provide an improved flight path type of automatic pilot of the type disclosed in the Bretoi patent with means for adjusting the gains of lagged rate and high passed pitch rate signals therein which signals are described in the patent to Bretoi, in accordance with the difference between an aircraft actual response and a model or desired aircraft response to a control signal.

A further object of this invention is to provide an improved flight path autopilot which includes a means for providing lagged pitch rate and high passed pitch rate signal components, through an integrator, with adaptive means for adjusting the gain of gain means in the feedback path of the integrator in accordance with the angle of attack of the aircraft and the pitch rate thereof.

The above and further objects of the invention and a means whereby they are attained may be had by a consideration of the following description taken in conjunction with the accompanying drawings wherein:

FIGURE 1 illustrates a block diagram of the invention applied to an automatic control apparatus for an aircraft;

FIGURE 2 shows the aircraft time constant computer; and

FIGURE 3 shows the high-passed pitch rate arrangement.

For analysis purposes, the flight path angle, $\gamma$, of the aircraft is the difference between the craft pitch attitude, $\theta$, and the craft angle of attack, $\alpha$, expressed as $\theta - \alpha = \gamma$. The ratio of flight path angle to pitch attitude, $$\frac{\gamma}{\theta} = \frac{1}{1 + T_a S}$$

By mathematical manipulation with $\theta - \alpha = \gamma$ and consequently $$\theta - \alpha = \frac{\theta}{T_a S + 1}$$

there is obtained, from the above relationship, that angle of attack $$\alpha = \frac{T_a S \theta}{T_a S + 1}$$

which may also be expressed as $$\alpha = \frac{\dot{\theta} T_a}{1 + T_a S}$$

where $S\theta = \dot{\theta}$. This airplane response equation wherein change in angle of attack results from craft pitch rate is used herein to compute the aircraft time constant $T_a$ that is a measure of the time required to change flight path angle for a change in pitch attitude expressed above as $$\frac{\gamma}{\theta} = \frac{1}{1 + T_a S}$$

The aircraft simplified pitch transfer function relating output to input or the response of aircraft pitch rate $\dot{\theta}$ to elevator deflection $\delta$ is as follows:

(1) $$\frac{\dot{\theta}}{-\delta} = \frac{-M\delta}{T_a} \cdot \frac{1 + T_a S}{S^2 + 2\zeta_a \omega_a S + \omega_a^2}$$

The autopilot control equation is:

(2) $$\delta = \left[ K_2 \frac{T_a S}{1 + T_a S} + \frac{T_a}{1 + T_a S} K_1 \right] \dot{\theta}$$

Making $T_a$, the time constant of the aircraft, in (1) $= T_a$, the time constant of the autopilot, in (2) and substituting (2) into (1) we get $$(1 + T_a S)\left( K_2 \frac{T_a S}{1 + T_a S} + \frac{T_a}{1 + T_a S} K_1 \right)\dot{\theta}$$

(3) $$\dot{\theta}(S^2 + 2\zeta_a \omega_a S + \omega_a^2) = \frac{M\delta}{+T_a}$$

Collecting terms we end up with (4) $$S^2 + S(2\zeta_a \omega_a - K_2 M\delta) + (\omega_a^2 - K_1 M\delta) = 0$$

a 2nd order equation describing the combined aircraft/controller or aircraft/autopilot response characteristic. The autopilot gains $K_2$ and $K_1$ of the second and third terms are to be varied to satisfy this equation, compensating for changes in the aircraft $\zeta_a$ and $\omega_a$.

In a preferred application of the invention to a three channel automatic pilot for an aircraft, the invention has been applied to the pitch channel of such automatic pilot. The invention is primarily concerned with the portion of the automatic pilot that provides the damping function for the channel for varying flight conditions.

In the arrangement, pitch rate sensing means provides its output to an integrator arrangement having adjustable gains in the feedback path thereof to supply components as in Bretoi consisting of a lagged pitch rate signal and a high passed pitch rate signal. The component rate signals are used to provide an output that may be used to operate a servo that controls attitude control means of the craft about it's lateral or pitch axis. This output is also supplied to a model which for the pitch axis is of the second order type to define the desired aircraft and autopilot response as to frequency and damping as in (4). The output of the model along with the aircraft pitch rate signal through two summing devices is used to control the gain of each of the said lagged pitch rate and high passed pitch rate components for various operating conditions, to equate model and aircraft responses.

In addition to the rate gyro for sensing attitude rate $\theta$ there is included an angle of attack sensor responsive to the angle attack $\alpha$ due to operation of the attitude changing means. This angle of attack signal combined with the lag pitch rate component from the integrator actuate computer means in accordance with the stated relationship, $$\alpha = \frac{\dot{\theta} Ta}{1+TaS}$$

for computing the time constant $Ta$ of the aircraft which is the change in flight path angle due to change in craft attitude. The aircraft time constant computer therefore adjusts the gain in a feedback path of the integrating means so that in the airplane response equation, angle attack is equal to lagged pitch rate.

The autopilot control Equation 2 as stated is as follows:

$$\delta e = \left[ K_2 \frac{TaS}{1+TaS} + \frac{Ta}{1+TaS} K_1 \right] \dot{\theta}$$

where $\delta e$ is the elevator deflection and $\dot{\theta}$ is craft pitch rate.

Having therefore obtained the computed time constant, $Ta$, of the aircraft, and using it in the automatic pilot, we compute the proper gains $K_1$ and $K_2$ for the above lagged pitch rate component and high passed pitch rate component of the aircraft control equation by comparing the aircraft pitch rate response $\dot{\theta}$ to elevator deflection $\delta e$ with the response of a model which defines the desired combined aircraft-autopilot response to the same control effect to provide the proper gains $K_1$ and $K_2$ to the lagged pitch rate and high passed pitch rate components and thus the proper damping and frequency terms $\zeta a$ and $\omega a$ in (4).

By determining the aircraft time constant $Ta$ which changes with changes in flight conditions, it is evident that the above Equation 3 that defines the combined automatic pilot and aircraft response, simplifies so that by collecting terms we end up with (4) $S^2 + S(2\zeta a \omega a - K_2 M\delta) + (\omega a^2 - K_1 M\delta) = 0$ this will be compared to the model response and equated thereto.

In the above S is the conventional Laplace operator, $\zeta a$ is the aircraft damping ratio, $\omega a$ is the aircraft natural frequency, $K_2$ is a variable gain quantity, $M\delta$ is the elevator control moment, $K_1$ is a variable gain quantity, and the joint response in (4) shows that the damping term or second term in (4) and the natural frequency term or third term in (4) are affected by the automatic pilot.

It is evident from the above that if we get exact compensation of $$\frac{TaS}{1+TaS}$$

and $$\frac{Ta}{1+TaS}$$

in the automatic pilot, we have expression (4). In this equation or expression (4), $K_2$ may be automatically varied for any changes in damping ratio and natural frequency of the aircraft resulting from various flight conditions so that the expressions always provides the exact compensation. These gain quantities $K_1$ and $K_2$ are associated respectively with a lagged pitch rate network and a high passed pitch rate network respectively. Thus, as stated if we automatically obtain exact compensation of the aircraft time constant $Ta$, then Equation 3 reduces to (4) and gain quantities $K_2$ and $K_1$ from (4) will augment the aircraft damping and natural frequency respectively and uniquely.

If these gains $K_2$ and $K_1$ can be determined adaptively for various flight conditions, we essentially have a system which actually identifies the vehicle and control is determined as a by product.

Having presented the mathematical theory on which the apparatus is based, a description of an embodiment of an adaptive flight path control system as shown in the figure follows. In the figure, an aircraft flight condition sensor such as a craft pitch rate sensor 10 supplies an output signal over conductor 11, subconductor 12, to a summing network 14 of a lagged pitch rate transmission arrangement 16. This lagged pitch rate arrangement includes an integrator 17 (which may be of the motor type) having its output supplied in feedback relation through conductor 18, gain device 19, to the summing network 14. The gain or transfer function of feedback device 19 is $1/Ta$, where $Ta$ is the aircraft time constant involved with the change in flight path angle for change in aircraft pitch attitude. The output which is lagged pitch rate of the lagged arrangement 16 appears at terminal 20 from where it is transmitted by conductor 21, a gain device 22, to a summing network 24.

The output of the pitch rate sensor 10 is also supplied to conductor 11, subconductor 26, gain device 27 to a summing network 30 of a high passed pitch rate transmission arrangement 29. This arrangement includes an integrator 31 in the feedback path, a gain device 32 in series therewith having the output of the gain device supplied to summing network 30. The output from summing network 30 is transmitted through conductor 33 not only to integrator 31 but also to the summing network 34 to supply a second input thereto. The transfer function of arrangement 29 is derived by reference to FIGURE 3.

$$\dot{\theta} K_2 = e_i; \quad e_o = \dot{\theta} K_2 - \frac{e_o}{TaS}$$

$$e_o + \frac{e_o}{TaS} = \dot{\theta} K_2$$

$$e_o \left(1 + \frac{1}{TaS}\right) = \dot{\theta} K_2$$

$$e_o = \frac{\dot{\theta} K_2}{1+TaS} TaS$$

Thus as in the Bretoi arrangement competent signals of lagged pitch rate and high passed pitch rate are supplied to summing network 24 which has its output supplied through conductor 37, a further summing network 39 to servo amplifier-servo 40. The servo amplifier and servo has its output supplied over conductor 41 to the aircraft 43 having a pitch axis control surface or attitude changing means thereof whereby the output of the servo 41 operates the attitude changing means to supply a control moment to the craft.

The following description is more directly concerned with the applicant's invention which is involved with the computation of the aircraft time constant $Ta$ and the adjustment of gain devices 22, 27, in the above arrangement.

An aircraft time constant computer 47 comprises an integrator 48, summing network 51 (a first absolute quantity device 49 and a second absolute quantity device 50. The lagged pitch rate signal $\dot{\theta} Ta / 1+Ta$ is supplied at terminal 20 to a conductor 53 extending to absolute value device 49. An aircraft angle of attack sensor 54 supplies an angle of attack signal (which by definition is equal to $$\frac{\dot{\theta}Ta}{1+TaS}\bigg)$$

to the absolute value device 50. The output from the two absolute value devices 49, 50 are applied to a summing network 51. The output of the network 51 controls the integrator 48 which adjusts the gain device 19 to provide exact compensation for the aircraft time constant $Ta$ as expressed in the mathematical computation above. The transfer function of the computer 47 is derived from FIGURE 2.

$$e_o = \epsilon\left(\frac{1}{S}\right) = \left(e_i - \frac{1}{K_4}e_o\right)\frac{1}{S}$$

$$\left(e_o S + \frac{1}{K_4}e_o\right) = e_i$$

$$e_o\left(S + \frac{1}{K_4}\right) = e_i$$

$$\frac{e_o}{e_i} = \frac{1}{S + \frac{1}{K_4}} = \frac{K_4}{1+KS}$$

$$e_i = \dot{\theta}$$

$$e_o = \frac{K_4\dot{\theta}}{1+K_4S}$$

by def., $\alpha = \frac{Ta\dot{\theta}}{1+TaS}$ $$\left|\frac{K_4\dot{\theta}}{1+K_4S}\right| - \left|\frac{Ta\dot{\theta}}{1+TaS}\right|$$

if the difference be $>o(+)$ run integrator 48 to reduce value of $K_4$ $<o(-)$ run integrator 48 to increase value of $K_4$.

Having obtained the correct value for $Ta$, there remains the proper adjustment to obtain the $K_1$ and $K_2$ gain quantities. This is obtained by comparing the response of the aircraft to response of model 60 to the same output on transmission means 41 with a signal conductor 61 to the model 60 corresponding to the elevator deflection.

The transfer function of the model is $$\frac{Km}{S^2+2\zeta m\omega m S+\omega m^2}$$

The output of the model is the desired pitch rate of the craft for the given elevator displacement signal. For comparing the model pitch rate with the aircraft pitch rate sensed by pitch rate gyro 10, the outputs of the model 60 and pitch rate gyro 10 are applied to a comparison arrangement 64 for comparing the high passed pitch rate signals. The comparator 64 comprises two absolute devices 65, 66, a first high passed network 67, and a second high passed network 68 and a summing network 69. The output of the model 60 which is the desired pitch rate, is supplied through the high passed network 67, absolute value device 66 to the summing network 69. Similarly the craft actual pitch rate signal on conductor 11 is applied through high passed network 68 and absolute signal device 65, which may be a full wave rectifier, to summing network 69. The difference between the two inputs (one the desired response, the other the actual response) to the summing network 69, if any, is applied through conductor 70 to an integrator 71 which adjusts the gain $K_2$ in gain device 27.

In a similar manner a comparing arrangement 74 consisting of two absolute value devices 78, 79 and two lagged networks 76, 77, and a summing network 80 adjusts an integrator 81 to modify the gain $K_1$ in gain device 22. The comparator 74 receives the model output pitch rate signal at lag device 76 which has its output supplied through absolute value device 78 to summing network 80. Similarly the pitch rate signal on conductor 11 is supplied to lag device 77, absolute value device 79 to summing network 80 with the difference between these signals being supplied to integrator 81. Thus the gain quantities $K_1$ and $K_2$ expressed in (2) above are determined.

For background purposes to Equation 1 reference may be made to a paper titled "Simplified Preliminary Analysis Technique for Automatic Longitudinal Control of Aircraft" by Remus N. Bretoi appearing in the transaction of the international conference on automatic control Heidelberg, Germany, September, 1956, 25–29, published by Berlag R. Oldenbourg, Munchen, Germany and sponsored by V. D. E. Equation 1 above corresponds with the Equation 13 page 113 of the Bretoi paper.

It will now be evident that I have provided a novel adaptive flight path control system for adjusting the computed aircraft time constant and the lagged pitch rate the high passed pitch rate gains which are used in the autopilot to compute the elevator displacement for the aircraft pitch rate response.

What is claimed is:

1. In control apparatus of an aircraft for controlling a flight condition of the craft, in combination:
    means responsive to the rate of change in the condition providing a first signal;
    second means comprising lag means including variable gain means receiving said rate signal for modifying said rate signal;
    third means responsive to the angle of attack of the aircraft providing a second signal; and
    signal combining means responsive to the angle of attack signal or second signal and the lagged condition rate signal from the lag means for varying the magnitude of the gain means for the lag means whereby the gain means is adjusted according to the time constant of the aircraft.

2. The apparatus of claim 1 wherein the means responsive to the rate of change in flight condition is an aircraft pitch rate responsive means.

3. The apparatus of claim 2 wherein there is provided a second variable gain device receiving said first signal and the second means modifying said rate signal also provides with the second variable gain device a high passed pitch rate signal which determines in part the displacement of a pitch attitude control surface of the craft.

4. The apparatus of claim 3, wherein the resultant signal that determines the total displacement of the pitch attitude control surface is applied to a model which in turn supplies an output that is the desired combined control apparatus and aircraft pitch rate response;
    means including means providing a high passed pitch rate signal and for combining the actual craft pitch rate signal and the output of the model; and
    means responsive to the difference in the actual craft pitch rate signal and the model signal adjusting the gain of the pitch rate effect appearing in one of the lagged pitch rate component or in the high passed pitch rate component signals.

5. The apparatus of claim 2, wherein the variable gain means of the lag means has a transfer function inversely proportional to the aircraft time constant.

6. In apparatus for an aircraft having attitude changing means for controlling angular motion of the craft about an axis thereof, in combination:
    detecting means sensing the angular rate of the craft about said axis;
    computing means including integrator means, both responsive to said detecting means with the integrator means thus receiving one input;
    a feedback path for the integrator means providing a second input thereto, whereby the output of the computing means consists of a high passed angular rate component related to the damping term of the aircraft control equation and a lagged angular rate component of the computing means, said output related to the frequency term of the equation determining at least in part the extent of displacement for said attitude changing means;

means including a model supplying an output that defines the desired combined apparatus and aircraft response said model being responsive to said output from the computing means; and summing means responsive to the output of the model and said detecting means, varying the gain of one of said rate components.

7. The apparatus of claim 6 and summing means responsive to an angle of attack ($\alpha$) of the aircraft and to the lagged angular rate component $Ta\theta/1+TaS$ adjusting gain means in the integrator feedback path so that the adjusted transfer function of the gain means is a in accordance with $1/Ta$ where $Ta$ is the aircraft flight path response to change in aircraft pitch attitude or the time constant by which the flight path angle lags pitch attitude.

8. In control apparatus for an aircraft having pitch attitude changing means for controlling angular motion of the craft about the pitch axis thereof, in combination:

first means sensing craft pitch rate providing a first signal;
integrator means including a motor means responsive to said first means signal;
gain means arranged in a feedback path for the motor;
adjusting means for the gain means of the integrator means responsive to craft angle of attack and the output of the integrator means;
whereby the output of the integrator means comprises a lagged angular rate component, said output of the integrator means determining at least in part the extent of displacement to be given attitude control means;
a model supplying an output representing a desired control apparatus-aircraft response;
a lagged pitch rate gain computer; and
means responsive to the algebraic sum of the absolute value of said output from the model and the absolute value of the craft angular rate, adjusting said computer.

9. In control apparatus for an aircraft having first or attitude changing means for controlling angular motion of the craft about an axis thereof, second means sensing craft angular rate providing a first signal varying with the craft angular rate about said axis;

integrator means responsive to said first signal from said second means;

variable gain means arranged in a feedback path of the integrator means;
a second sensing means providing a second signal, the ratio of the two signals being $Ta/1+TaS$;
summing means controlled by the second sensing means and the output of the integrator means with the summing means adjusting the varying gain means to the magnitude $1/Ta$ wherein $Ta$ is the time constant by which the second signal lags the first signal.

10. In autopilot control apparatus for an aircraft said aircraft having attitude control means for controlling angular motion of the craft about an axis thereof, detecting means sensing the angular rate of the craft about said axis;

integrator means responsive to said angular rate from the detecting means;
adjustable gain means arranged in a feedback path of the integrator means whereby the output of the integrator means comprises a craft lagged angular rate component, said output determining at least in part the extent to which the attitude control means is to be operated;
means sensing angle of attack resulting from operation of the attitude control means in accordance with said output; and
further means responsive to the angle of attack sensing means and the output of the integrator means operating said adjustable gain means by the difference of the absolute magnitudes of angle of attack and output of the integrator to the magnitude $1/Ta$ where $Ta$ is the aircraft time constant.

References Cited

UNITED STATES PATENTS

| | | |
|---|---|---|
| 2,953,733 | 9/1960 | Bretoi. |
| 3,113,749 | 12/1963 | Lee. |
| 3,216,676 | 11/1965 | Brown et al. |

ORIS L. RADER, Primary Examiner

T. E. LYNCH, Assistant Examiner

U.S. Cl. X.R.

244—77; 318—489